(12) United States Patent
Kondo et al.

(10) Patent No.: US 11,666,811 B2
(45) Date of Patent: Jun. 6, 2023

(54) SWING MEASURING ATTACHMENT, AND SWING MEASURING APPARATUS

(71) Applicant: Seiko Epson Corporation, Toyko (JP)

(72) Inventors: Atsushi Kondo, Azumino (JP); Takeshi Fujishiro, Shiojiri (JP)

(73) Assignee: SEIKO EPSON CORPORATION

( * ) Notice: Subject to any disclaimer, the term of this patent is extended or adjusted under 35 U.S.C. 154(b) by 72 days.

(21) Appl. No.: 17/210,558

(22) Filed: Mar. 24, 2021

(65) Prior Publication Data
US 2021/0299531 A1 Sep. 30, 2021

(30) Foreign Application Priority Data
Mar. 25, 2020 (JP) .............................. JP2020-053838

(51) Int. Cl.
| | |
|---|---|
| A63B 60/46 | (2015.01) |
| G01P 13/00 | (2006.01) |
| A63B 60/16 | (2015.01) |
| A63B 53/14 | (2015.01) |

(52) U.S. Cl.
CPC .............. *A63B 60/46* (2015.10); *A63B 60/16* (2015.10); *G01P 13/00* (2013.01); *A63B 53/14* (2013.01); *A63B 2220/803* (2013.01); *A63B 2220/833* (2013.01); *A63B 2225/50* (2013.01)

(58) Field of Classification Search
CPC ......... A63B 60/46; A63B 60/16; A63B 53/14; A63B 2220/803; A63B 2220/833; A63B 2225/50; A63B 69/3632; G01P 13/00; G01P 1/023
USPC ........................................................... 73/493
See application file for complete search history.

(56) References Cited

U.S. PATENT DOCUMENTS

| | | | |
|---|---|---|---|
| 2013/0065703 A1* | 3/2013 | Rose | A63B 69/3632 473/223 |
| 2013/0288812 A1 | 10/2013 | Kato et al. | |
| 2016/0317895 A1* | 11/2016 | Yarmis | H01M 50/20 |

FOREIGN PATENT DOCUMENTS

JP 2013-226318 A 11/2013

* cited by examiner

*Primary Examiner* — Lee E Rodak
*Assistant Examiner* — Byung Ro Lee
(74) *Attorney, Agent, or Firm* — Harness, Dickey & Pierce, P.L.C.

(57) ABSTRACT

A swing measuring attachment includes a base portion and a protrusion protruding from the base portion, in which the protrusion is provided with a screw thread, the protrusion including a projection at a front end of the protrusion.

7 Claims, 8 Drawing Sheets

SWING MEASURING ATTACHMENT, AND SWING MEASURING APPARATUS

The present application is based on, and claims priority from JP Application Serial Number 2020-053838, filed Mar. 25, 2020, the disclosure of which is hereby incorporated by reference herein in its entirety.

BACKGROUND

1. Technical Field

The present disclosure relates to an attachment for use in a golf swing measuring apparatus, and a swing measuring apparatus to be paired with the attachment.

2. Related Art

There is known a technology in which a swing measuring apparatus equipped with an inertial sensor is attached to a shaft of a golf club to analyze a swing of the golf club. For example, JP 2013-226318 A discloses a structure in which a sensor unit used in a behavioral analysis of a swing is attached to a grip end portion of a shaft. According to JP 2013-226318 A, a hole is opened at the grip end portion, and the sensor unit is fixed to the grip end portion by inserting a front-end bulging portion of a pin shape into the hole. Note that an end face at which the hole of the grip end portion is provided is formed flat, and an attachment face of the sensor unit facing the end face is formed flat as well.

Unfortunately, although there are various shapes such as a dome shape in the shapes of the grip end portion, there is no fixed standard, and thus there is an issue in that the attachment structure in JP 2013-226318 A is limited in grip shape that can be stably fixed.

SUMMARY

A swing measuring attachment according to the present application includes a base portion, and a protrusion protruding from the base portion along a normal direction of the base portion, in which the protrusion is provided with a screw thread, and a projection having no screw thread is provided at an end portion on an opposite side of the protrusion from the base portion.

A swing measuring apparatus according to the present application includes the swing measuring attachment, the swing measuring unit including an inertial sensor, and a measuring apparatus main body accommodating the swing measuring unit.

DESCRIPTION OF EXEMPLARY EMBODIMENTS

Embodiment 1

Overview of Golf Swing Measuring Apparatus

Figure 1:
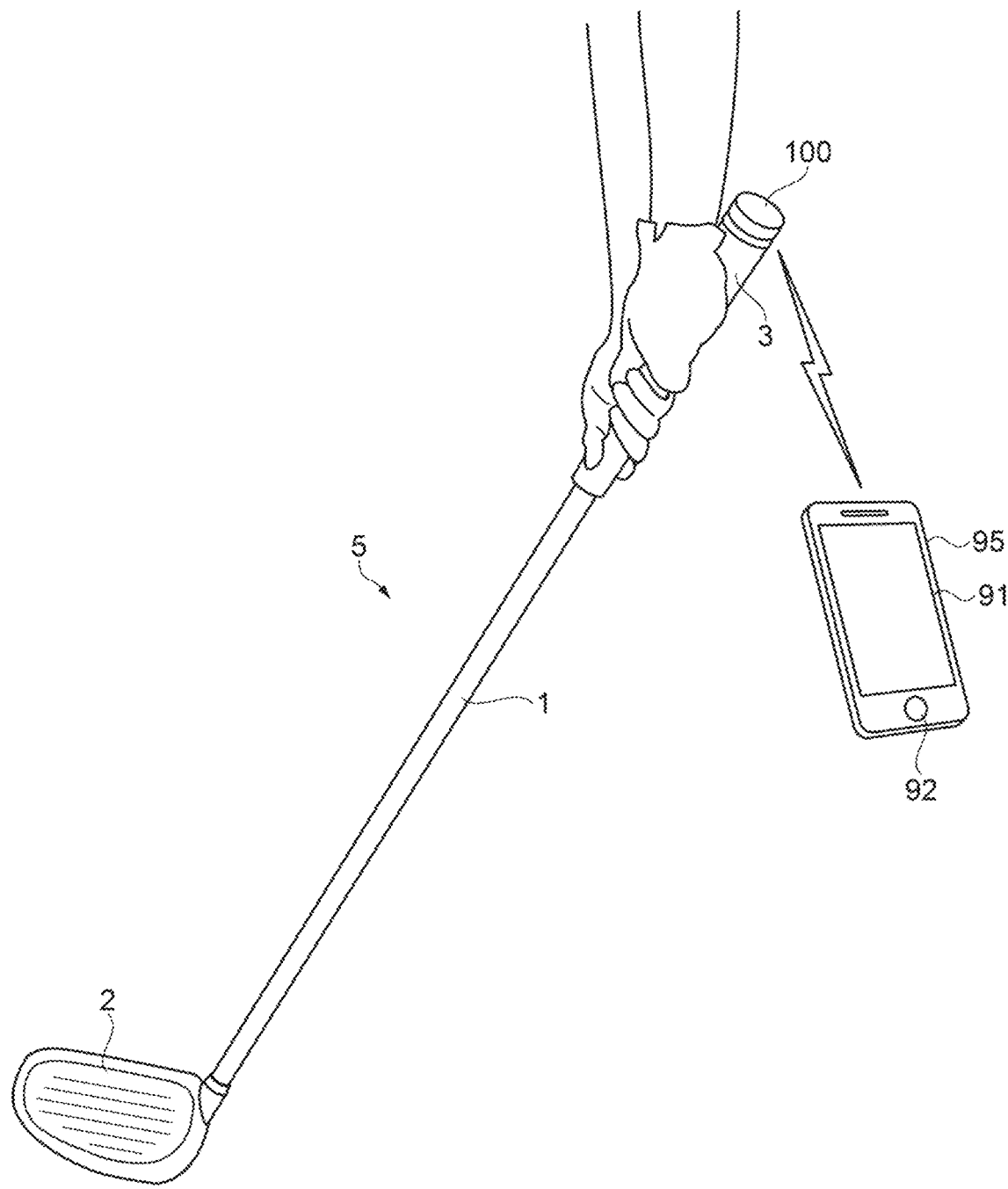
FIG. 1 is a schematic configuration view of a golf swing measuring apparatus in Embodiment 1.
Figure 2:
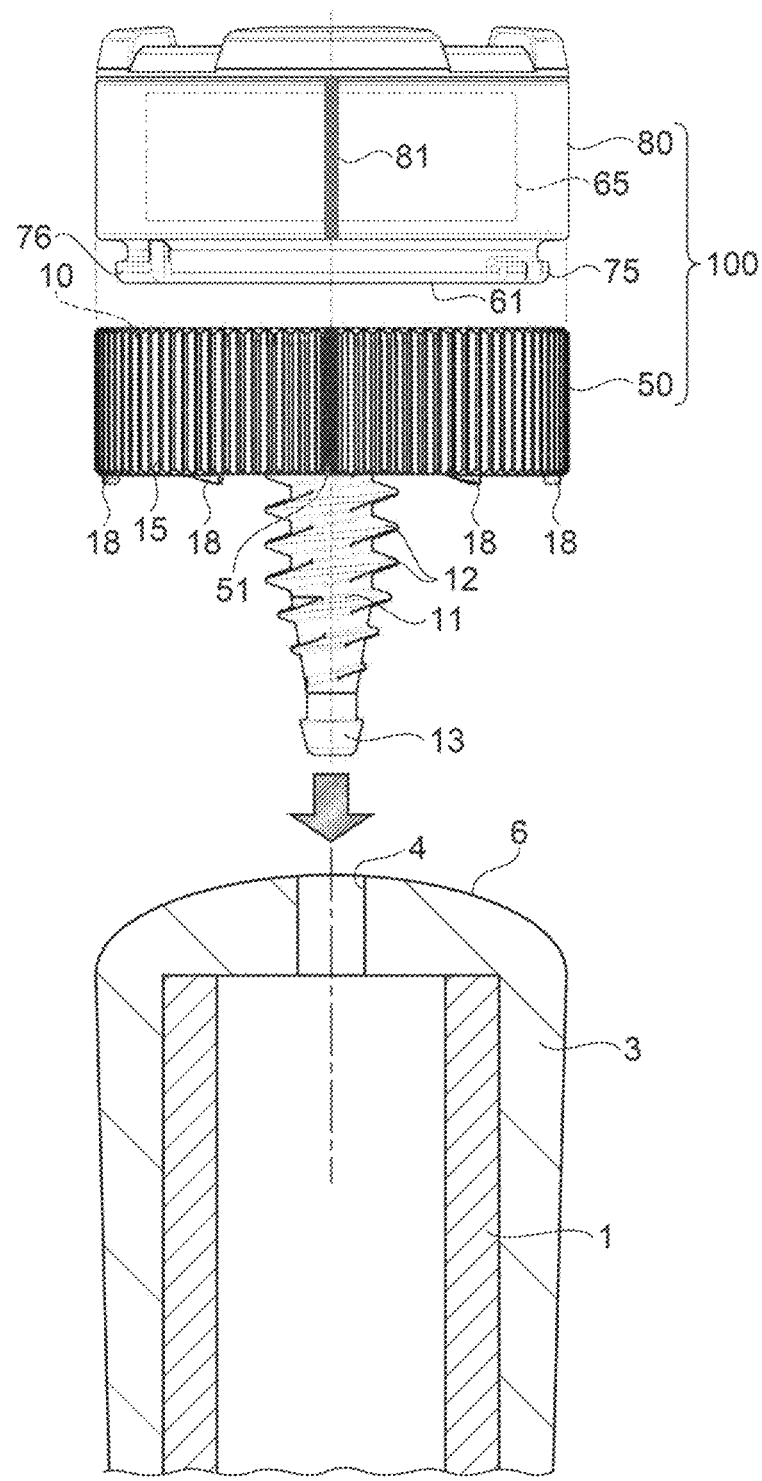
FIG. 2 is a side exploded view of an attachment structure of a swing measuring apparatus.
Figure 3:
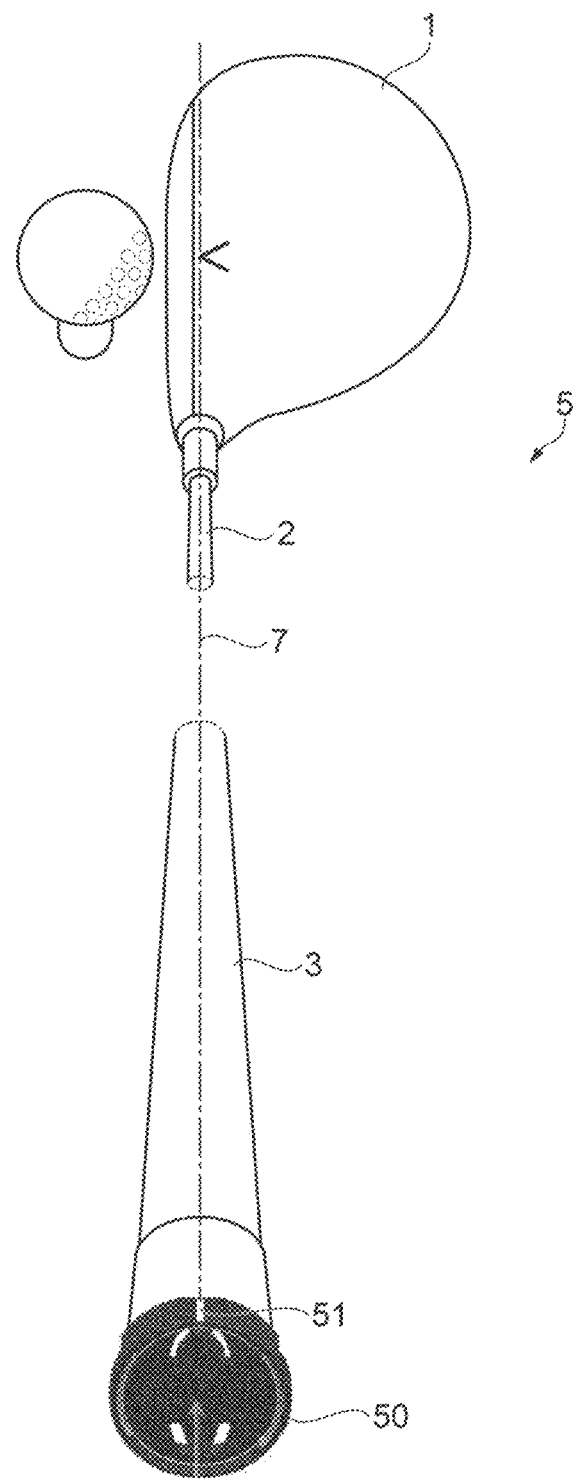
FIG. 3 is a view illustrating an attachment direction of a swing measuring apparatus.

FIG. 1 is a schematic configuration view of a golf swing measuring apparatus according to Embodiment 1. FIG. 2 is a side exploded view of an attachment structure of a swing measuring apparatus. FIG. 3 is a view illustrating an attachment direction.

As illustrated in FIG. 1, a swing measuring apparatus 100 is attached to an end portion of a grip 3 of a golf club 5. The swing measuring apparatus 100 is a swing analyzing apparatus, which measures swing data by an inertial sensor that is built in the apparatus and the like when a user swings with the golf club 5, and transmits the data to a smartphone 95 via wireless communication. The smartphone 95 on which a dedicated application is installed analyses the swing data that are received to display head speed, swing trajectory, and the like. Note that the smartphone 95 includes an operation button 92 and a display 91. The display 91 includes a touch panel, and functions as an operation unit as well.

The golf club 5 includes a head 2 at a front end of a shaft 1 made from carbon, and the grip 3 is attached to a base end side of the shaft 1. The grip 3 is composed of an elastomer such as synthetic rubber, and a hole is opened at an end portion of the grip 3.

As illustrated in FIG. 2, the swing measuring apparatus 100 is constituted by a measuring apparatus main body 80, an attachment 50 for attaching the swing measuring apparatus 100, and the like. The measuring apparatus main body 80 is attached, via the attachment 50, to a hole 4 at an end portion 6 of the grip 3. The attachment 50 is also referred to as a swing measuring attachment. Note that description will be given below on the supposition that a side of the swing measuring apparatus 100 is designated as an upper side and a side of the grip 3 as a lower side. Synonymously, the upper side and the lower side are also expressed as an upper portion, a lower portion, an upper face, and a lower face.

The measuring apparatus main body 80 is a cylindrical housing that houses a swing measuring unit 65 and the like thereinside. A resin for injection molding is used for a material of the housing. For example, an ABS resin and a PC resin are favorably used.

On the swing measuring unit 65, an inertial sensor including a gyroscopic sensor and an acceleration sensor, a sensor output detection circuit, a wireless communication circuit, a power circuit (all of these not illustrated), and the like are mounted. The wireless communication circuit is equipped with a communication module compliant with Bluetooth™ wireless communication standard. Note that it is sufficient for the wireless communication circuit to perform short-range wireless communication with the smartphone 95, and a wireless communication module compliant with the wireless LAN standard or the Near Field Communication (NFC) standard may be used, for example.

A primary battery is attached to the power circuit. Note that a rechargeable battery such as a lithium polymer battery may be attached, and when the rechargeable battery is attached, a charging terminal for charging the battery, an associated circuit, and the like are mounted.

Fitting portions 75 and 76 for coupling with the attachment 50 are formed at a lower portion of the measuring apparatus main body 80. The fitting portions 75 and 76 are circular arc-shaped convex portions, and are engaged with corresponding circular arc-shaped fitting portions of the attachment 50.

Further, the measuring apparatus main body 80 is provided with a mark 81 for positioning at a side face of the measuring apparatus main body 80. The mark 81 is a straight line directed from the upper portion toward the lower portion of the measuring apparatus main body 80. An extension direction of the straight line coincides with an extension direction of the shaft 1 of the golf club 5.

The attachment 50 is constituted by a base portion 10 having a planar circular shape, a protrusion 11 protruding downward from the base portion 10, a skirt portion 15 of a tubular shape provided at an outer circumferential edge of the base portion 10, and the like. A screw thread 12 is formed at an outer periphery of the protrusion 11. The screw thread 12 is a tapping screw. Further, a projection 13 is formed at a front end of the protrusion 11. In side view from a direction orthogonal to a protruding direction of the protrusion 11, the projection 13 forms a trapezoidal shape, and a circumferential edge portion of the lower side forms, with the upper side being directed downward, a turning back portion formed wider in width than the protrusion 11. In other words, the front end of the protrusion 11 is provided with the projection 13 including the turning back portion serving as a hook when the attachment 50 is removed and falls down. In addition, the projection 13 is provided with no screw thread.

A vertical knurling is formed at the circumference of the skirt portion 15. Further, a mark 51 for positioning is also provided. The mark 51 is formed thicker than the knurling around the mark 51, which enhances visibility.

The grip 3 is attached covering an end portion of the shaft 1 of a pipe shape. The end portion 6 of the grip 3 is dome-shaped, and the hole 4 is opened at a top portion of the end portion 6. The hole 4 is in communication with an interior of the shaft 1.

When attaching the attachment 50 to the grip 3, the protrusion 11 of the attachment 50 is inserted into the hole 4 as a fitted hole and is screwed in the clockwise direction. At this time, as illustrated in FIG. 3, the attachment 50 is attached with the mark 51 for positioning corresponding to a leading edge of the head 2 of the golf club 5 in a rotational direction of the attachment 50. Specifically, the attachment 50 is attached to the grip 3 such that a reference line 7 extending from the leading edge of the head 2 of the golf club 5 coincides with the mark 51 for positioning. Alternatively, in case of a square grip in which a back line of the grip 3 is located on the 6 o'clock side, the attachment 50 is attached such that the mark 51 for positioning is on the 12 o'clock side. Note that in FIG. 3, the reference line 7 coincides with the back line of the grip 3.

The measuring apparatus main body 80 is then attached to the attachment 50 having been assembly attached. When the measuring apparatus main body 80 is assembly attached to the attachment 50, the mark 51 for positioning of the attachment 50 becomes in a straight line with the mark 81 of the measuring apparatus main body 80.

Configuration of Attachment

Figure 4:
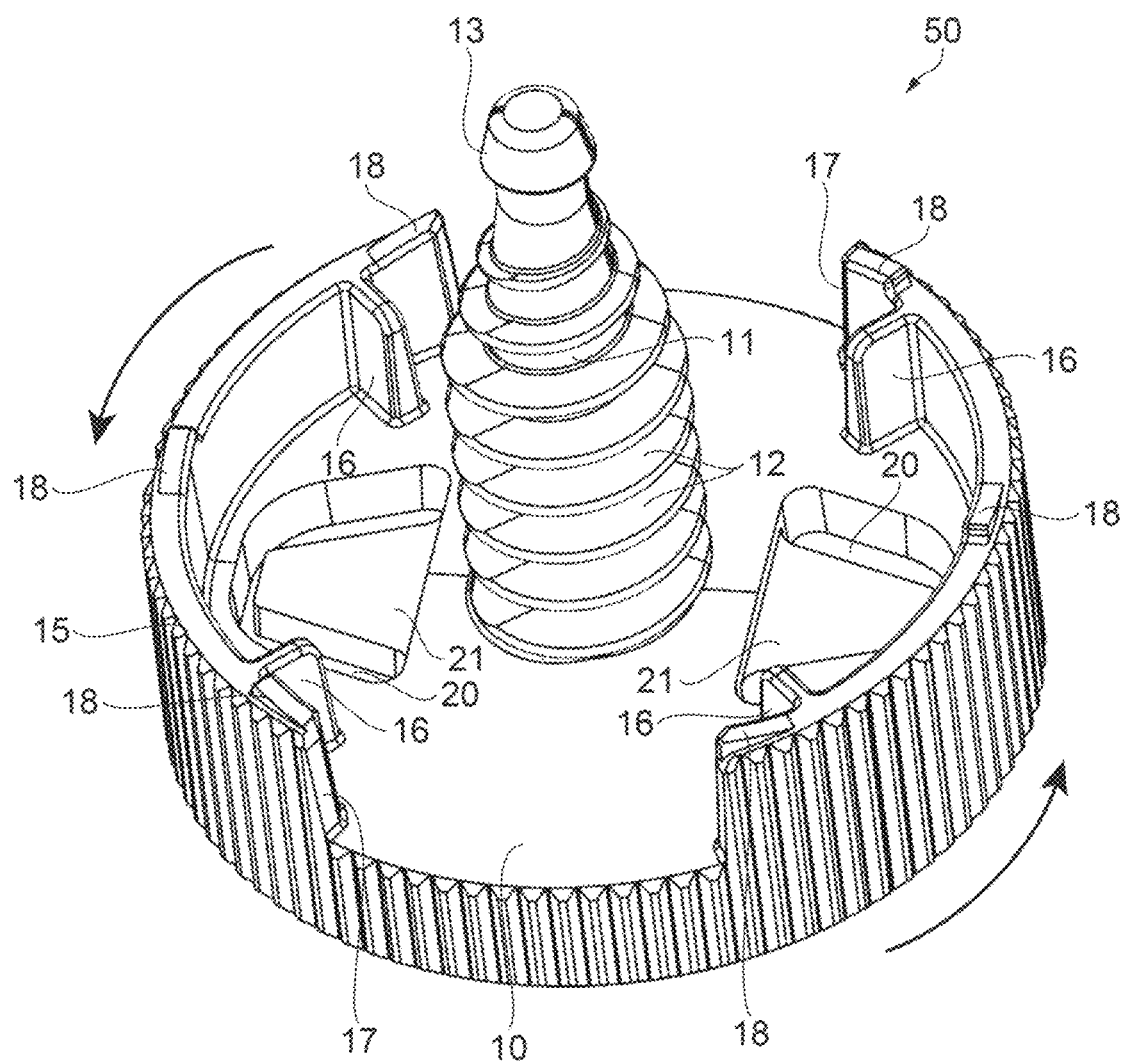
FIG. 4 is a perspective view of an attachment.
Figure 5:
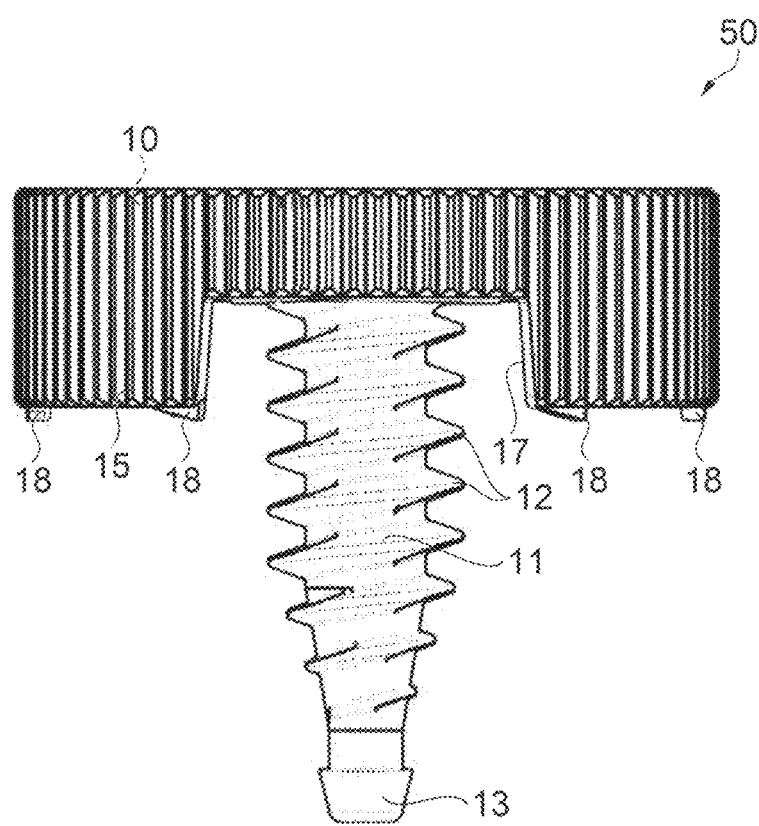
FIG. 5 is a side view of an attachment.

FIG. 4 is a perspective view of an attachment. FIG. 5 is a side view of the attachment.

FIG. 4 is a perspective view of the attachment 50 viewed obliquely from the lower side. As illustrated in FIG. 4, the protrusion 11 protrudes downward from a center of the base portion 10 of a disk shape along the normal direction of the base portion 10. The skirt portion 15 is formed at the outer circumferential edge of the base portion 10 in a direction parallel to the protruding direction of the protrusion 11. Note that the skirt portion 15 also extends to an upper side of the base portion 10, which will be described in detail later.

Two cut-out portions 17 are formed at the skirt portion 15. As illustrated in FIG. 5, the cut-out portion 17 is formed wider than the width of the protrusion 11 including the screw thread 12. In other words, the cut-out portion 17 is formed longer than the width of the protrusion 11. The two cut-out portions 17 are provided at positions facing each other with the protrusion 11 interposed therebetween. When molding the attachment 50 by an injection molding method, the protrusion 11 including the screw thread 12 can be easily formed by using a slide type for the two cut-out portions 17.

As illustrated in FIG. 4, a rib 16 rising from the base portion 10 is provided inside the skirt portion 15. The rib 16 is in contact with the base portion 10 and the skirt portion 15, and extends from the skirt portion 15 toward the protrusion 11. A rising corner portion of the rib 16 forms a corner radius. In a preferred example, two ribs 16 are provided at the skirt portion 15 on one hand partitioned by the cut-out portions 17. Similarly, two ribs 16 are also provided at the skirt portion 15 on the other hand.

Further, the skirt portion 15 is provided with a slide portion 18 of a wedge shape at an end portion of the skirt portion 15. The slide portion 18 is a projection of a wedge shape with the arrowhead side being low and the end side being high in an arrow indicating the rotational direction of the attachment 50. When attaching the attachment 50 to the grip 3, the slide portion 18 of the skirt portion 15 abuts against the end portion 6 of the grip 3 and the attachment 50 is fixed by the biting of the slide portion 18 along with being screwed into the grip 3. In a preferred example, the skirt portion 15 on one hand is provided with three slide portions 18. Similarly, the skirt portion 15 on the other hand is also provided with three slide portions 18.

A hole 20 of a U shape is opened at the base portion 10, and a plate spring portion 21 is provided along the hole 20. The hole 20 is paired with the plate spring portion 21. The pair is provided in two pairs facing each other with the protrusion 11 interposed therebetween. The lower side of the plate spring portion 21 of a trapezoidal shape is provided on a side of the protrusion 11.

Dimensional Case Example in Preferred Example

Here, the material and dimensions of the attachment 50 in a preferred example will be described.

Polyamide is suitably used for the material of the attachment 50. Note that the material is not limited to polyamide, and may be a resin having equivalent rigidity and impact resistance.

In a preferred example, the attachment 50 is approximately 27 mm in diameter and the skirt portion 15 is approximately 8 mm in height. Further, the length of the protrusion 11 from the base portion 10 is approximately 20 mm. Note that the measuring apparatus main body 80 is approximately 27 mm in diameter that is the same as that of the attachment 50, and is approximately 12 mm in height.

Also, the measuring apparatus main body 80 is approximately 15 g in weight. As such, a swing analysis can be performed without interfering a swinging due to lightweight and compactness.

As illustrated in FIG. 5, in side view, the screw thread 12 of the protrusion 11 has the same width up to approximately twice the height of the skirt portion 15, and tapers from there toward the projection 13 at the front end. In other words, a part of the protrusion 11 including the screw thread 12 is of a straight shape, the part being engaged with the hole 4 of the grip 3. In a preferred example, the part of the protrusion 11 is of the straight shape from the base portion 10 up to approximately 11 mm and tapers from there up to the front end. Here, the term "straight shape" means that, in a cross-sectional view from a direction orthogonal to the axis of the protrusion 11, two envelope lines formed by connecting, along the axis, a plurality of threads of the screw thread 12 are parallel to each other particularly at a portion engaged with the grip.

As for the width of the screw thread 12, when, for example, the diameter of the hole 4 of the grip 3 is approximately 3 mm, the screw thread 12 of the protrusion 11 is designated to have a nominal diameter of M 7.5 mm and a pitch of 2.0 mm. Further, P-tap type is suitable for the type of screw. Note that it suffices that the screw thread 12 be provided by a tapping screw corresponding to the diameter of the hole 4 and the material of the grip 3 without being limited to the numerical value described above. Also, it is preferred that the width of the protrusion 11 be approximately 4.5 mm or greater. Note that it suffices that the screw thread 12 of the protrusion 11 be optimized corresponding to the width of the grip 3, the size of the hole 4, and the like without being limited to the material and dimensions described above.

Fitting Structure Between Attachment and Measuring Apparatus Main Body

Figure 6:
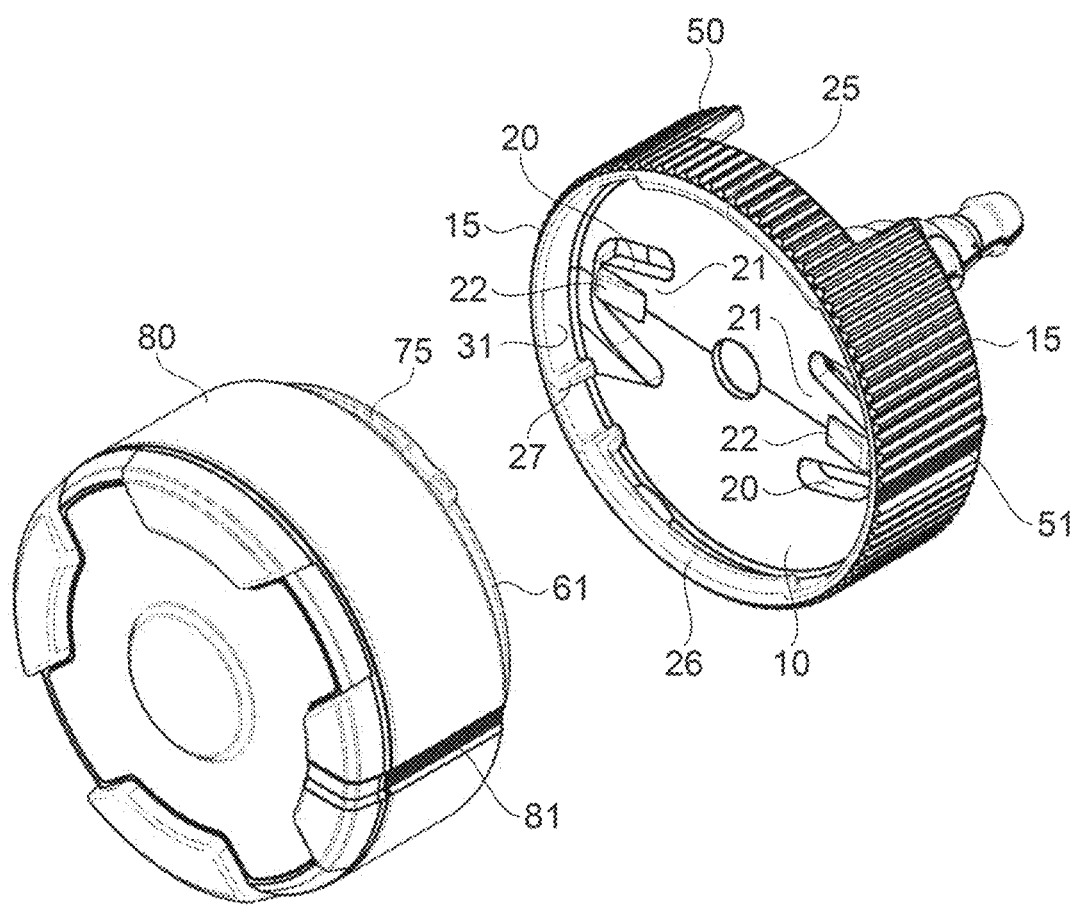
FIG. 6 is an assembling exploded view of an attachment and a measuring apparatus main body.
Figure 7:
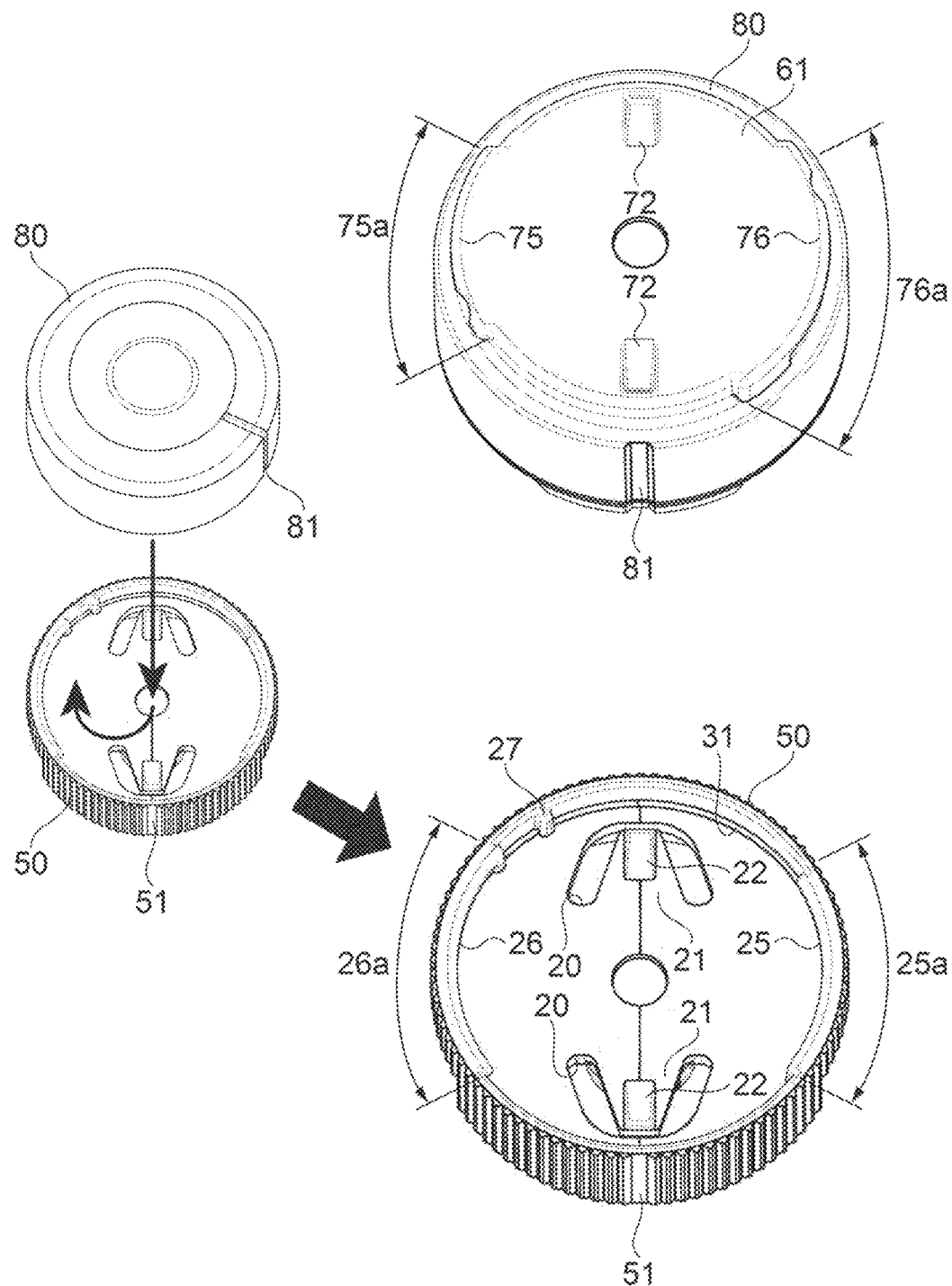
FIG. 7 is an assembling explanatory view of an attachment and a measuring apparatus main body.

FIG. 6 is an assembling exploded view of an attachment and a measuring apparatus main body. FIG. 7 is an assembling explanatory view of the attachment and the measuring apparatus main body.

As illustrated in FIG. 6, the skirt portion 15 also extends to an upper side of the attachment 50, and an upper portion of the attachment 50 forms a concave portion 31 of a concave shape having the base portion 10 as the bottom face and the skirt portion 15 as the side wall. The concave portion 31 is engaged with a convex portion 61 of the lower portion of the measuring apparatus main body 80. The base portion 10 is provided with a claw portion 22 on the upper side of the plate spring portion 21 at an upper face of the base portion 10. The claw portion 22 is a portion for generating a click feeling when combined with the measuring apparatus main body 80.

The attachment 50 includes an attachment structure for integrating with the measuring apparatus main body 80 to be paired on an opposite side from the protrusion 11 of the base portion 10. The attachment structure includes fitting portions 25 and 26 composed of two circular arc-shaped convex portions provided inside the skirt portion 15. The circular arc of the fitting portion 25 differs in length from the circular arc of the fitting portion 26, where the circular arc of the fitting portion 26 is longer in length than the circular arc of the fitting portion 25. Specifically, as illustrated in the lower right figure of FIG. 7, a length 26a of the fitting portion 26 is longer than a length 25a of the fitting portion 25.

Further, as illustrated in the upper right figure of FIG. 7, the measuring apparatus main body 80 is provided with the fitting portions 75 and 76 composed of two circular arc-shaped convex portions corresponding to the fitting portions 25 and 26 of the attachment 50 at the lower portion of the measuring apparatus main body 80. As in the fitting portions 25 and 26, a length 76a of the fitting portion 76 is longer than a length 75a of the fitting portion 75.

FIG. 6 is an exploded view in a state where the measuring apparatus main body 80 is attached to the attachment 50, and thus the mark 51 for positioning is in a straight line with the mark 81. The fitting portion 25 of the attachment 50 corresponds to the fitting portion 75 of the measuring apparatus main body 80, where in the fitting state, the fitting portion 75 engages with a lower side of the fitting portion 25. Similarly, the fitting portion 26 of the attachment 50 corresponds to the fitting portion 76 (FIG. 7) of the measuring apparatus main body 80.

The exploded figure on the left side of FIG. 7 illustrates how the measuring apparatus main body 80 is attached to the attachment 50. The lower right figure is an enlarged view of the attachment 50. The upper right figure is a view of the measuring apparatus main body 80 being in a turned back state.

When attaching the attachment 50, the measuring apparatus main body 80 is inserted into the attachment 50 in a state where the mark 81 of the measuring apparatus main body 80 is located at 4 o'clock when the mark 51 of the attachment 50 being the reference is located at 6 o'clock. At this time, the fitting portion 76 of the measuring apparatus main body 80 is inserted into a gap between the fitting portion 25 and the fitting portion 26 of the attachment 50. Similarly, the fitting portion 75 of the measuring apparatus main body 80 is inserted into a gap between the fitting portion 25 and a convex portion 27 of the attachment 50.

Note that the fitting portion 25 corresponds to a first fitting portion, and the fitting portion 26 corresponds to a second fitting portion. Also, a configuration may be employed in which three or more fitting portions are provided. In this case, it is preferred that the number of fitting portions of the measuring apparatus main body 80 to be paired correspond to the number of fitting portions of the attachment 50.

Here, the convex portion 27 is provided to prevent difference in the attachment direction. Specifically, the convex portion 27 prevents the fitting portion 76 from being mistakenly inserted into the gap on this side as well when the convex portion 27 is not provided to cause the mark 51 to be oriented opposite to the mark 81.

After the measuring apparatus main body 80 is inserted into the attachment 50, the measuring apparatus main body 80 is rotated in the clockwise direction until the position of the mark 81 of the measuring apparatus main body 80 reaches the 6 o'clock position from the 4 o'clock position. This allows the fitting portion 75 of the measuring apparatus main body 80 to fit into the lower side of the fitting portion 25 of the attachment 50. Similarly, the fitting portion 76 of the measuring apparatus main body 80 fits into the lower side of the fitting portion 26 of the attachment 50.

Further, the convex portion 61 of the measuring apparatus main body 80 is provided with two concave portions 72 at positions corresponding to the claw portions 22 of the base portion 10 of the attachment 50. When the measuring apparatus main body 80 is rotated to be fitted into the attachment 50, the two claw portions 22 of the attachment 50 engage with the two concave portions 72 of the measuring apparatus main body 80. Note that until the claw portions 22 engage with the concave portions 72, the claw portions 22 are in a state of being pressed by the plate spring portions 21 against the lower side where the protrusion 11 is provided. When the claw portions 22 engage with the concave portions 72, the claw portions 22 having been pressed enter into the concave portions 72 to release the pressing force, thus generating a click feeling. This allows the user to recognize that the measuring apparatus main body 80 has been properly attached to the attachment 50.

As described above, the attachment 50 for measuring a golf swing includes the base portion 10, and the protrusion 11 protruding from the base portion 10, where the protrusion 11 is provided with the screw thread 12, the protrusion 11 including the projection 13 at the front end of the protrusion 11.

According to the above configuration, the screw thread 12 of the protrusion 11 can be screwed into the hole 4 at the end portion 6 of the grip 3 to ensure a fixation. Thus, regardless of a shape of the end portion 6, the attachment 50 can be stably fixed to the end portion 6 of the grip 3. Further, even when a stress is generated at the attachment 50 by a swing or the like in the pulled-out direction, the projection 13 at the front end is hooked by the hole 4, thus preventing the attachment from dropping out.

Thus, regardless of a shape of the grip end portion, a swing measuring attachment 50 that can stably fix the attachment 50 to the grip 3 can be provided.

Further, in side view, the part of the screw thread 12 of the protrusion 11 configured to engage with the hole 4 of the grip 3 has a straight shape.

This allows, at the part of the straight shape, the screw thread 12 of the protrusion 11 to be uniformly in contact with an inner wall of the hole 4 of the grip 3 over a large area, which enables the attachment 50 to be stably fixed.

Further, in plan view, the base portion 10 forms a circular shape, and is provided with the skirt portion 15 at the outer circumferential edge of the base portion 10 in the protruding direction of the protrusion 11.

This allows, even when the end portion 6 of the grip 3 includes a curved face of a dome shape and the like, the end portion of the skirt portion 15 to abut against the curved face, thus enabling the attachment 50 to be stably fixed.

Further, the skirt portion 15 is provided with a plurality of the ribs 16 rising from the base portion 10. This allows, even when the curved face of the end portion 6 of the grip 3 is small, the plurality of the ribs 16 to abut against the curved face, thus enabling the attachment 50 to be stably fixed. Moreover, the plurality of the ribs 16 rising from the base portion 10 can prevent the skirt portion 15 from expanding, and can also reinforce the overall configuration of an attachment 55.

Further, in side view, the skirt portion 15 is provided with the cut-out portion 17 that is wider than the width of the protrusion 11 including the screw thread 12.

This allows the protrusion 11 including the screw thread 12 to be easily formed by using a slide type for the two cut-out portions 17 when molding the attachment 50 by an injection molding method.

Further, in side view, the skirt portion 15 includes, at an outer circumferential side face thereof, the mark 51 for positioning.

This allows the attachment 50 to be attached to a correct position at the grip 3 by using the mark 51 for positioning.

Further, the attachment 50 includes an attachment structure for integrating with the measuring apparatus main body 80 to be paired on the opposite side from the protrusion 11 of the base portion 10, where in plan view, the attachment structure includes two fitting portions 25 and 26 of a circular arc-shape along a circumferential edge portion of the base portion 10, where the two fitting portions 25 and 26 of a circular arc-shape differ in length from each other. The attachment 50 is also provided with the convex portion 27 for preventing difference in the attachment direction.

This allows the attachment structure including the fitting portions 25 and 26 to properly integrate the attachment 50 and the measuring apparatus main body 80 with each other.

The swing measuring apparatus 100 includes the attachment 50, the swing measuring unit 65 including an inertial sensor, and the measuring apparatus main body 80 accommodating the swing measuring unit 65.

This makes it possible to provide the swing measuring apparatus 100 that can be stably fixed to the grip 3 regardless of the shape of the end portion 6 of the grip 3.

Embodiment 2

Different Aspects of Attachment

Figure 8:
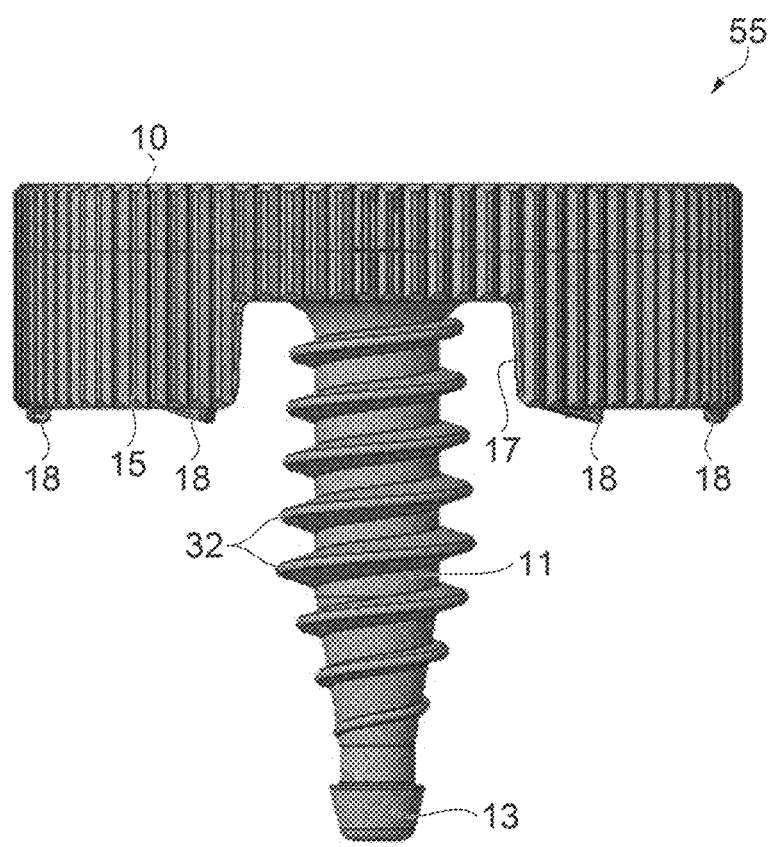
FIG. 8 is a side view of an attachment in Embodiment 2.

FIG. 8 is a side view of an attachment according to Embodiment 2, and FIG. 8 corresponds to FIG. 5.

The attachment 55 illustrated in FIG. 8 differs from Embodiment 1 in that the attachment 55 includes a screw thread 32 different from the screw thread 12 of the attachment 50 in Embodiment 1. Hereinafter, the same components as those in Embodiment 1 are given the same reference signs, and redundant description with Embodiment 1 will be omitted.

The screw thread 32 provided on the protrusion 11 of the attachment 55 includes a central portion having a large diameter in the axial direction. Specifically, the screw thread 32 has a larger diameter around a portion beyond the skirt portion 15 than a root portion on a side of the base portion 10, and tapers from there toward the projection 13 at the front end. In other words, a part of the screw thread 32, which is engaged with the hole 4 of the grip 3, is large in diameter. The rest of the configuration is the same as the configuration in Embodiment 1.

Note that how large the diameter of the part of the screw thread 32 is made from the root portion may be appropriately set according to the diameter of the hole 4 and the material of the grip 3.

According to the attachment 55 of Embodiment 2, the screw thread 32 at the part that is engaged with the hole 4 of the grip 3 is large in diameter, which enables the screw thread 32 to be deeply screwed into the inner wall of the hole 4, thus making it possible to firmly and stably fix the attachment.

What is claimed is:
1. A swing measuring attachment, comprising:
a base portion having a planar base and a skirt that extends outward from the planar base; and
an axially extending protrusion protruding from the base portion,
wherein the skirt extends outward from the planar base in a direction parallel with the axially extending protrusion,
the skirt includes an annular base surface at a terminal end thereof located distal from the planar base, the annular surface being parallel with the planar base,
the annular surface including a plurality of wedge-shaped sliding portions formed thereon,
the axially extending protrusion includes a threaded section that is provided with a screw thread,
a projection having no screw thread is provided at a terminal end of the protrusion that is distal from the base portion, and
a cylindrical section is positioned between the threaded section and the projection, the cylindrical section including a smooth outer surface that extends in parallel with an axis defined by the axially-extending protrusion.

2. The swing measuring attachment according to claim 1, wherein the base portion has a circular shape.

3. The swing measuring attachment according to claim 1, wherein the skirt portion is provided with a plurality of ribs that are in contact with the base portion and the skirt portion, the plurality of ribs extending from the skirt portion toward the protrusion.

4. The swing measuring attachment according to claim 1, wherein the skirt portion is provided with a cut-out portion that is wider than a width of the protrusion.

5. The swing measuring attachment according to claim 1, wherein the skirt portion includes, at an outer circumferential side face thereof, a mark for positioning.

6. The swing measuring attachment according to claim 1, comprising, on an opposite side of the base portion from the protrusion, an attachment structure for a measuring apparatus main body, the swing measuring attachment including a first fitting portion and a second fitting portion along a circumferential edge portion of the base portion, and the first fitting portion and the second fitting portion differ in length from each other.

7. A swing measuring apparatus, comprising:

a swing measuring attachment according to claim 1;

a swing measuring unit including an inertial sensor; and a measuring apparatus main body accommodating the swing measuring unit.

* * * * *